US009304060B2

(12) United States Patent
Husted et al.

(10) Patent No.: US 9,304,060 B2
(45) Date of Patent: Apr. 5, 2016

(54) WIRE RETENTION CLIP

(71) Applicant: DELPHI TECHNOLOGIES, INC., Troy, MI (US)

(72) Inventors: Harry L. Husted, Lake Orion, MI (US); James D. Ward, Washington, DC (US)

(73) Assignee: Delphi Technologies, Inc., Troy, MI (US)

( * ) Notice: Subject to any disclaimer, the term of this patent is extended or adjusted under 35 U.S.C. 154(b) by 338 days.

(21) Appl. No.: 13/706,846

(22) Filed: Dec. 6, 2012

(65) Prior Publication Data

US 2014/0157868 A1    Jun. 12, 2014

(51) Int. Cl.
| G01N 7/00 | (2006.01) |
| G01M 15/10 | (2006.01) |
| H02G 3/32 | (2006.01) |

(52) U.S. Cl.
CPC ............... *G01M 15/10* (2013.01); *H02G 3/32* (2013.01); *Y10T 24/44547* (2015.01); *Y10T 24/44573* (2015.01)

(58) Field of Classification Search
CPC ........... Y10T 24/44547; Y10T 24/44573; Y10T 24/3444; Y10T 24/44769; Y10T 24/344; Y10T 22/44573; Y10T 24/44017; Y10T 24/44034; Y10T 24/44615; H02G 3/32; G01M 15/10; F16B 2/22
USPC ................. 73/23.31, 243; 606/142, 143, 157; 29/243; 24/522, 519
See application file for complete search history.

(56) References Cited

U.S. PATENT DOCUMENTS

| 6,209,907 | B1 * | 4/2001 | Fischer | B60R 21/201 24/543 |
| 6,383,013 | B1 * | 5/2002 | Ghesla | G01D 11/24 439/408 |
| 7,172,456 | B1 * | 2/2007 | Nagy | H01R 13/72 174/135 |
| 7,446,260 | B2 * | 11/2008 | Hammonds | B65H 75/06 174/135 |
| 7,455,546 | B1 * | 11/2008 | Yoon | H01R 13/6392 439/369 |
| 8,167,288 | B2 * | 5/2012 | Despins | B25B 5/068 269/3 |
| 8,887,392 | B1 * | 11/2014 | Xu | F24F 13/22 248/205.1 |
| 2002/0007735 | A1 * | 1/2002 | Volo | B01D 46/0005 96/134 |
| 2004/0028118 | A1 * | 2/2004 | Sidoni | G01K 1/143 374/208 |
| 2009/0069999 | A1 * | 3/2009 | Bos | G07C 5/085 701/102 |
| 2010/0038113 | A1 * | 2/2010 | Huang | H02G 3/32 174/135 |
| 2010/0128753 | A1 * | 5/2010 | Claypool | G01K 1/02 374/102 |
| 2010/0185406 | A1 * | 7/2010 | Blanchard | G01R 31/041 702/64 |
| 2012/0115347 | A1 * | 5/2012 | Nickel | H01R 13/639 439/345 |

FOREIGN PATENT DOCUMENTS

JP    10153491 A  *  6/1998

* cited by examiner

*Primary Examiner* — Eric S McCall
*Assistant Examiner* — Mohammed E Keramet-Amircolai
(74) *Attorney, Agent, or Firm* — Thomas H. Swomey

(57) ABSTRACT

A wire retention clip includes a first compartment for allowing at least a first wire to pass through the compartment uninterrupted and for retaining the at least one wire to the wire retention clip. The wire retention clip also includes a second compartment that is distinct from the first compartment and contains and electronic device.

13 Claims, 7 Drawing Sheets

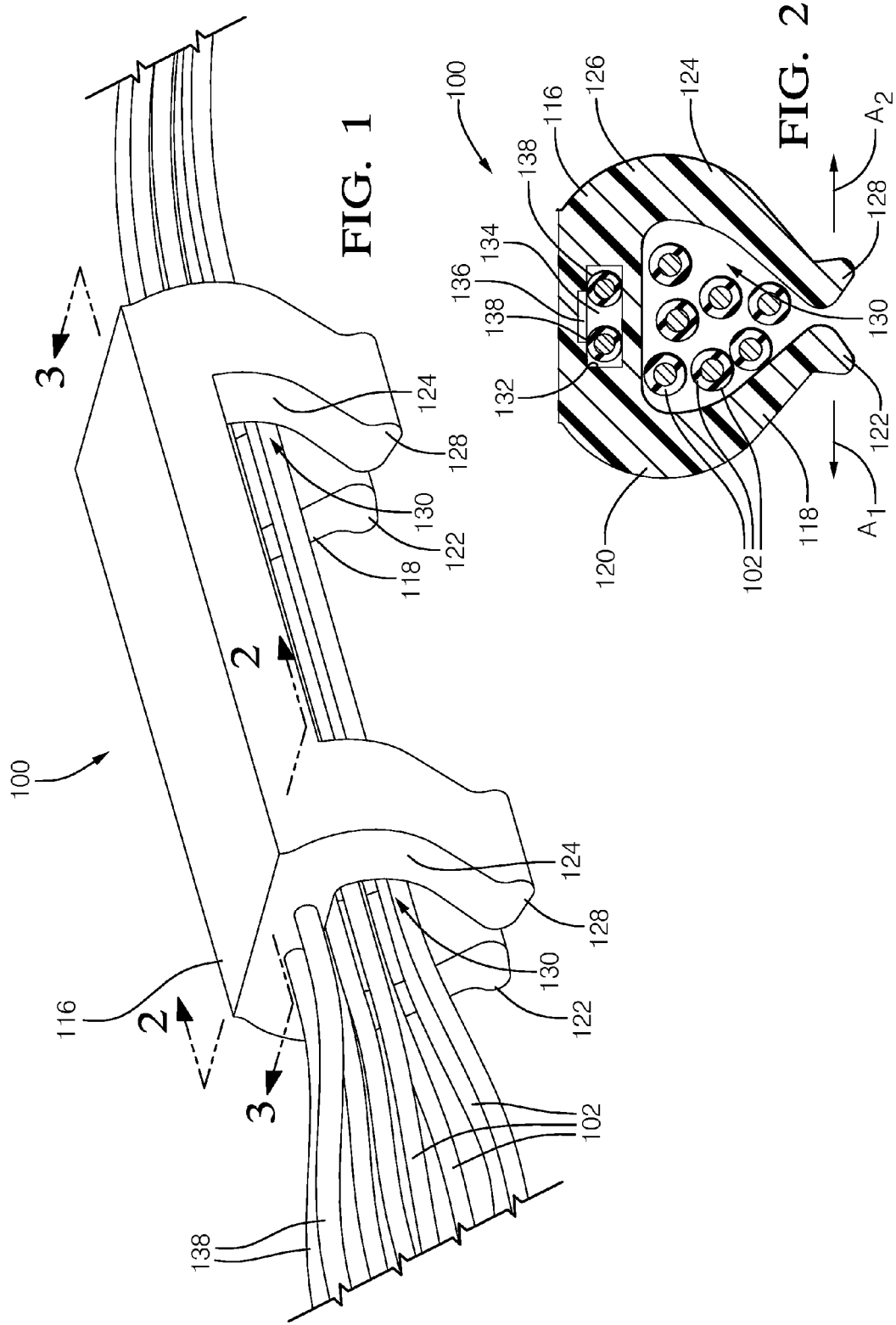

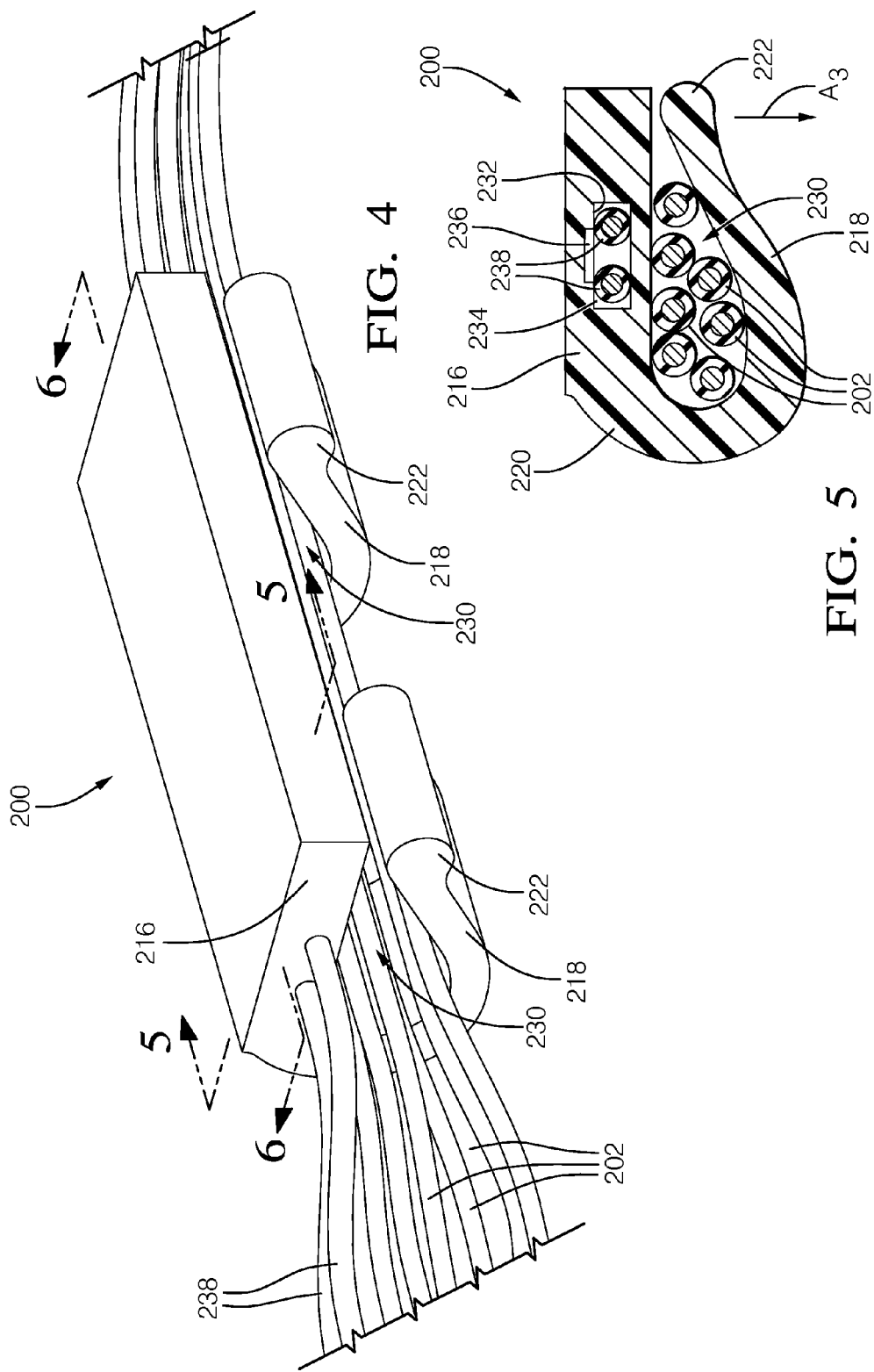

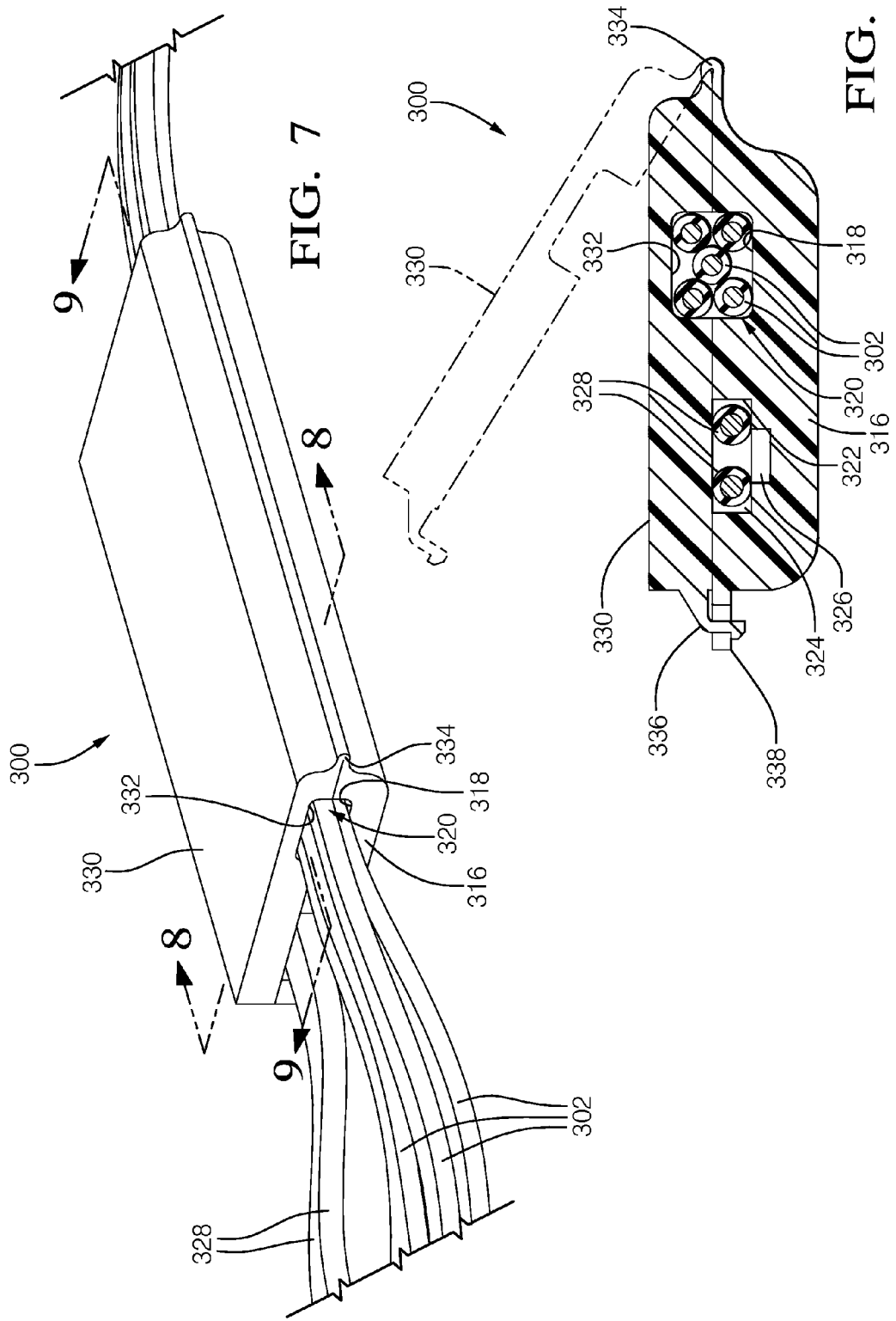

US 9,304,060 B2

WIRE RETENTION CLIP

TECHNICAL FIELD OF INVENTION

The present invention relates to a wire retention clip for retaining at least one wire; more particularly to a wire retention clip with a first compartment for retaining at least one wire and a second compartment containing an electronic device.

BACKGROUND OF INVENTION

Exhaust systems include exhaust sensors positioned to monitor the exhaust gases of the exhaust system. The exhaust sensors are typically associated with a controller comprising microelectronics in order to provide signals and/or commands to components of the exhaust system. Exhaust sensors commonly employ a plurality of wires which comprise a wire harness for operation of the exhaust sensor. The wires of the wire harness can be held together with tape, a sheath, or clips.

Some exhaust sensors require a compensation resistor to be associated with the exhaust sensor and the electronics of the exhaust system in order to provide signals to the controller of the exhaust system in order to compensate for part-to-part variability in the sensor itself. See for example US Patent Application Publication number 2007/0146114 which is commonly assigned and which is incorporated herein by reference in its entirety. In one arrangement, a trim resister is used to provide this compensation. In this solution, a laser is used to remove portions of a resistive film comprising the resistive path by removing portions of the resistive surface until the desired resistance is achieved. In the past, the trim resistor has been placed in a connector of the exhaust sensor which is used to connect the exhaust sensor to the rest of the sensor system. While this location may be effective, the connector must be custom designed which makes switching to a different connector difficult. In the past, the trim resistor has also been encapsulated and mounted to the connector via a metal bracket and covered by a flexible plastic boot. This approach may be size intensive and costly to implement.

In order for vehicles to comply with emission regulations, it is important that automotive devices such as sensors, actuators, and controllers used by the vehicle emission control system are authentic. That is, that the devices meet original-equipment-manufacturer (OEM) performance and quality specifications, and are not unauthorized copies, sometimes referred to as black-market automotive parts, parts that may not meet OEM specifications. It has been suggested that identification codes be stored in an electronic device which communicates the identification codes to engine controller. See for example U.S. patent application Ser. No. 13/432,520 which is commonly assigned and which is incorporated herein by reference in its entirety. The electronic device storing the identification codes may be packaged in a way similar to the packaging of the trim resistor as described above.

What is needed is a device both retains the wires of a wire harness as well as packages an electronic device.

SUMMARY OF THE INVENTION

Briefly described, a wire retention clip includes a first compartment for allowing at least a first wire to pass through the compartment uninterrupted and for retaining the at least one wire to the wire retention clip. The wire retention clip also includes a second compartment that is distinct from the first compartment and contains an electronic device.

BRIEF DESCRIPTION OF DRAWINGS

This invention will be further described with reference to the accompanying drawings in which:

FIG. 1 is an isometric view of a first embodiment of a wire retention clip in accordance with the invention;

FIG. 2 is a cross-sectional view of the wire retention clip of FIG. 1 taken through section line 2-2;

FIG. 4 is an isometric view of a second embodiment of a wire retention clip in accordance with the invention;

FIG. 5 is a cross-sectional view of the wire retention clip of FIG. 4 taken through section line 5-5;

FIG. 7 is an isometric view of a third embodiment of a wire retention clip in accordance with the invention and shown in an exemplary environment;

FIG. 8 is a cross-sectional view of the wire retention clip of FIG. 7 taken through section line 8-8;

DETAILED DESCRIPTION OF INVENTION

As used herein, the term electronic device is any physical entity in an electronic system used to affect the electrons or their associated fields in a manner consistent with the intended function of the electronic system. By non-limiting example only, electronic devices may include integrated circuits, capacitors, inductors, resistors, diodes, transistors, and combinations of the same.

Figure 3:
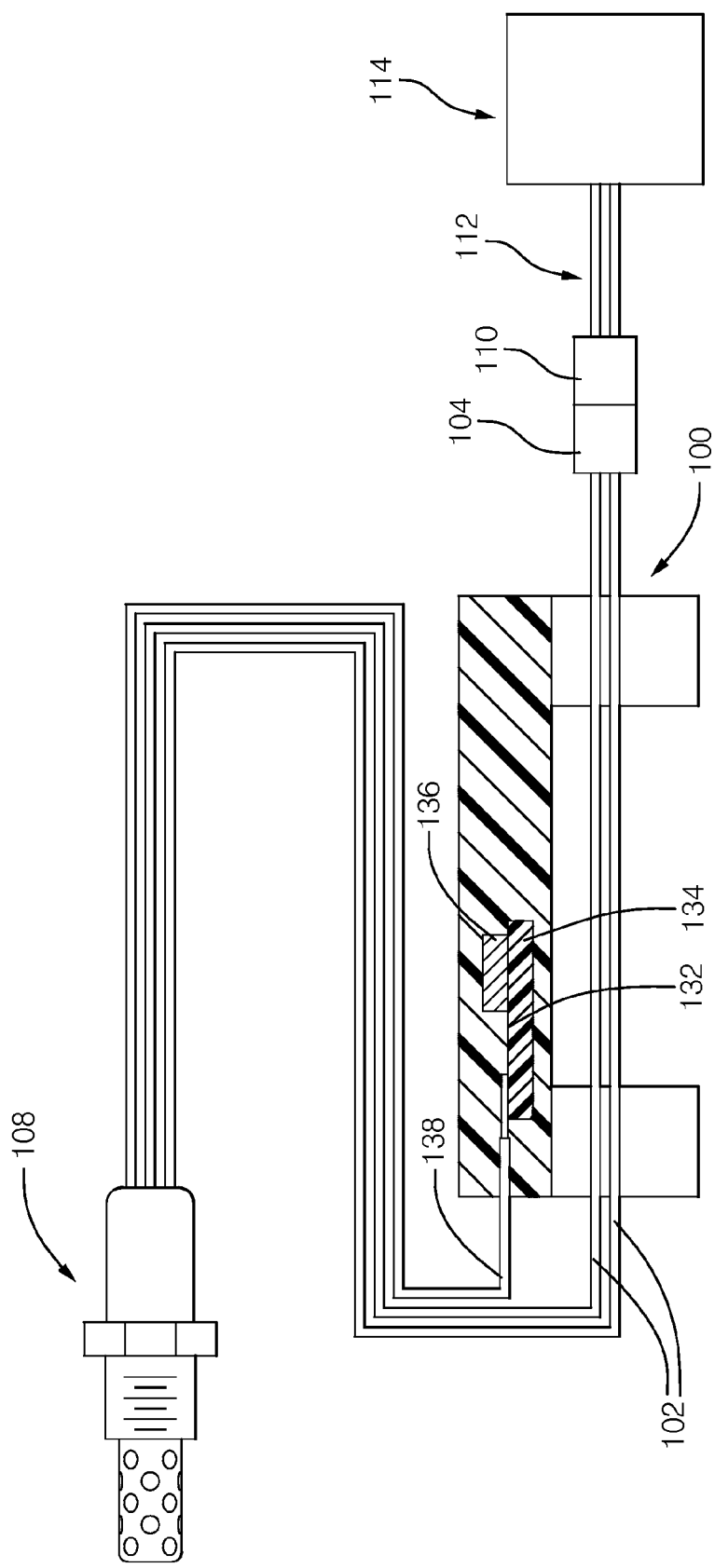
FIG. 3 is a cross-sectional view of the wire retention clip of FIG. 1 taken through section line 3-3 and shown in an exemplary environment.

Reference will be made to FIGS. 1-3 showing a first embodiment of a wire clip 100 which is used to retain a plurality of wires 102 together. Wires 102 may terminate at one end to an electrical device which is illustrated as exhaust gas sensor 108. Wires 102 may terminate at a second end with a device connector 104 which is used to interface with a controller connector 110 attached to a controller wiring harness 112 which is connected to a controller 114. Controller 114 sends and/or receives signals to/from exhaust gas sensor 108 during the operation of exhaust gas sensor 108. Wire clip 100, wires 102, device connector 104, exhaust gas sensor 108, controller connector 110, controller wiring harness 112, and controller 114 comprise an exhaust gas sensor system as shown in FIG. 3.

Wire clip 100 includes body 116 which may, for example, be made of a plastic material. Body 116 includes first arms 118 which extend away from body 116 along one side of body 116. First arms 118 each include a first arm first end 120 attached to body 116 and a first arm second end 122 distal from first arm first end 120 that is not attached to body 116. Body 116 also includes second arms 124 which extend away from body 116 along one side of body 116 that is opposite to the side of body 116 from which first arms 118 extend. Second arms 124 each include a second arm first end 126 attached to body 116 and a second arm second end 128 distal from second arm first end 126 that is not attached to body 116. First arms 118 and second arms 124 extend away from body 116 in the same general direction and are shaped to define first compartments 130 therebetween.

First arms 118 are flexible and resilient such that first arm second ends 122 are able to flex away from second arm second ends 128 in the direction of arrow $A_1$ while wires 102 are being inserted into first compartments 130 in a direction perpendicular to arrow $A_1$ between first arm second ends 122 and second arm second ends 128. First arm second ends 122 spring back toward second arm second ends 128 when wires 102 have been inserted into first compartments 130. Similarly, second arms 124 are flexible and resilient such that second arm second ends 128 are able to flex away from first arm second ends 122 in the direction of arrow $A_2$ while wires 102 are being inserted into first compartments 130 in a direction perpendicular to arrows $A_1$, $A_2$ between first arm second ends 122 and second arm second ends 128. Second arm second ends 128 spring back toward first arm second ends 122 when wires 102 have been inserted into first compartments 130. First arms 118 and second arms 124 may preferably be molded as a single piece of plastic with body 116 using an injection molding process. In this way, wires 102 pass through first compartments 130 uninterrupted. While two first arms 118 are shown, it should now be understood that a fewer or greater quantity of first arms 118 may be included. Similarly, it should now also be understood that a fewer or greater quantity of second arms 124 may be included.

Body 116 also includes a second compartment 132 defined by a hollow section within body 116. Second compartment 132 holds an electronic device illustrated as circuit board 134 with integrated circuit 136. Wires 138 extend into second compartment 132 for electrical connection with circuit board 134 and integrated circuit 136. The end of wires 138 opposite to the end connected to circuit board 134 and integrated circuit 136 terminate at exhaust gas sensor 108 for connection to exhaust gas sensor 108. Circuit board 134 and integrated circuit 136 may be used, for non-limiting example only, to provide compensation to exhaust gas sensor 108 for part-to-part variations as disclosed in US Patent Application Publication number 2007/0146114. Second compartment 132 is distinct from first compartments 130 and may be formed by overmolding circuit board 134 and integrated circuit 136 when body 116, first arms 118, and second arms 124 are formed by plastic injection molding. In this way, circuit board 134 and integrated circuit 136 are encapsulated within second compartment 132 and protected from environmental contaminants which could result in unsatisfactory operation of circuit board 134 and integrated circuit 136.

Figure 6:
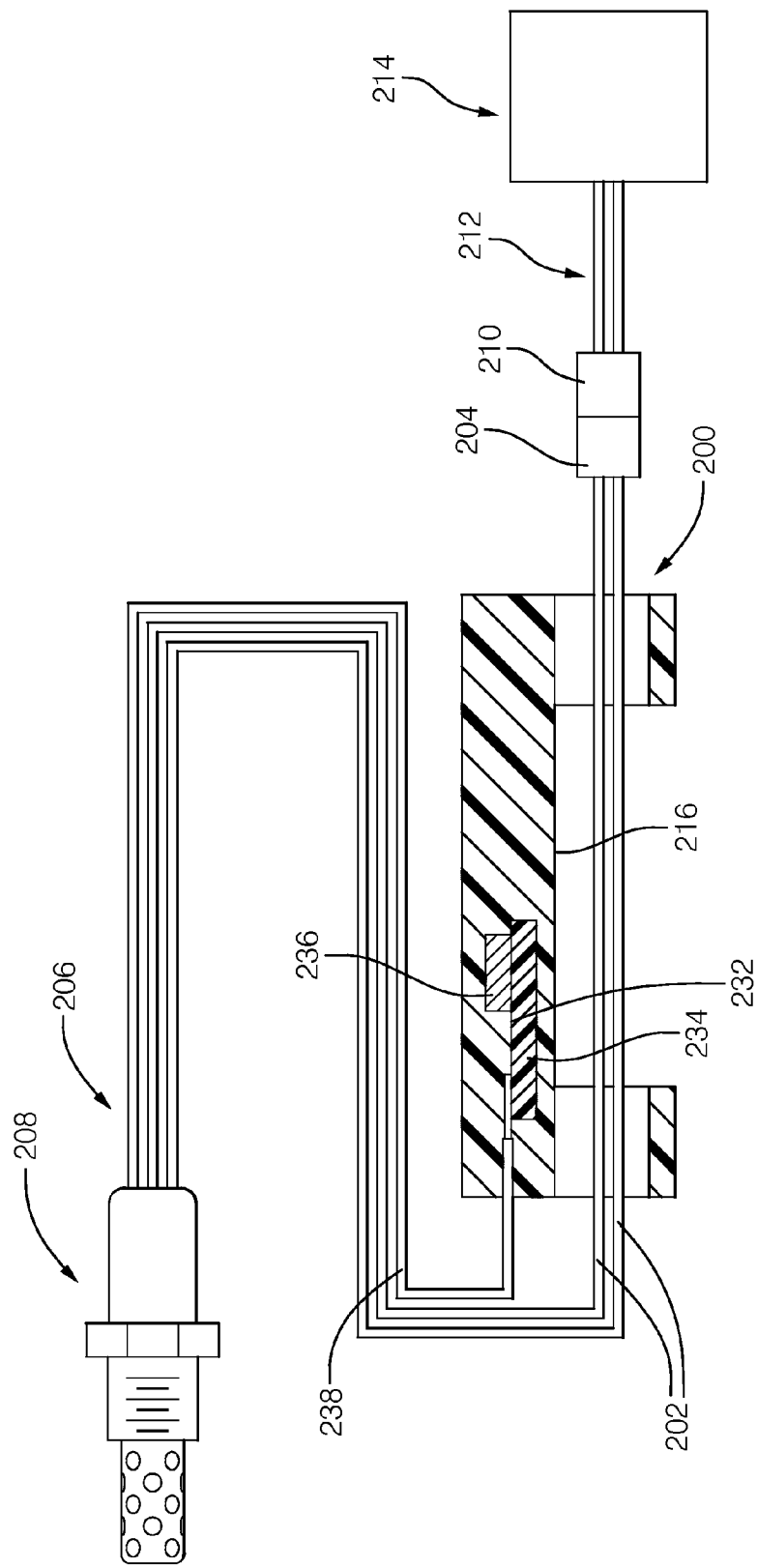
FIG. 6 is a cross-sectional view of the wire retention clip of FIG. 4 taken through section line 6-6.

Reference will be now made to FIG. 4-6 which is a second embodiment of a wire clip 200 which is used to retain a plurality of wires 202 together. Wires 202 may terminate at one end to an electrical device which is illustrated as exhaust gas sensor 208. Wires 202 may terminate at a second end with a device connector 204 which is used to interface with a controller connector 110 attached to a controller wiring harness 212 which is connected to a controller 214. Controller 214 sends and/or receives signals to/from exhaust gas sensor 208 during the operation of exhaust gas sensor 208. Wire clip 200, wires 202, device connector 204, exhaust gas sensor 208, controller connector 210, controller wiring harness 212, and controller 214 comprise an exhaust gas sensor system as shown in FIG. 6.

Wire clip 200 includes body 216 which may, for example, be made of a plastic material. Body 216 includes arms 218 which extend away from body 216 along one side of body 216. Arms 218 each include an arm first end 220 attached to body 216 and an arm second end 222 distal from arm first end 220 that is not attached to body 216. Arms 218 are shaped to define first compartments 230 between arms 218 and body 216.

Arms 218 are flexible and resilient such that arm second ends 222 are able to flex away from body 216 in the direction of arrow $A_3$ while wires 202 are being inserted into first compartments 230 in a direction perpendicular to arrow A3 between arm second ends 222 and body 216. Arm second ends 222 spring back toward body 216 when wires 202 have been inserted into first compartments 230. Arms 218 may preferably be molded as a single piece of plastic with body 216 using an injection molding process. Wires 202 pass through first compartments 230 uninterrupted. While two arms 218 are shown, it should now be understood that a fewer or greater quantity of arms 218 may be included.

Body 216 also includes a second compartment 232 defined by a hollow section within body 216. Second compartment 232 holds an electronic device illustrated as circuit board 234 with integrated circuit 236. Wires 238 extend into second compartment 232 for electrical connection with circuit board 234 and integrated circuit 236. The end of wires 238 opposite to the end connected to circuit board 234 and integrated circuit 136 terminate at exhaust gas sensor 208 for connection to exhaust gas sensor 208. Circuit board 234 and integrated circuit 236 may be used, for non-limiting example only, to provide compensation to exhaust gas sensor 208 for part to part variations as disclosed in US Patent Application Publication number 2007/0146114. Second compartment 232 is distinct from first compartments 230 and may be formed by overmolding circuit board 234 and integrated circuit 236 when body 216 and arms 218 are formed by plastic injection molding. In this way, circuit board 234 and integrated circuit 236 are encapsulated within second compartment 232 and protected from environmental contaminants which could result in unsatisfactory operation of circuit board 234 and integrated circuit 236.

Figure 9:
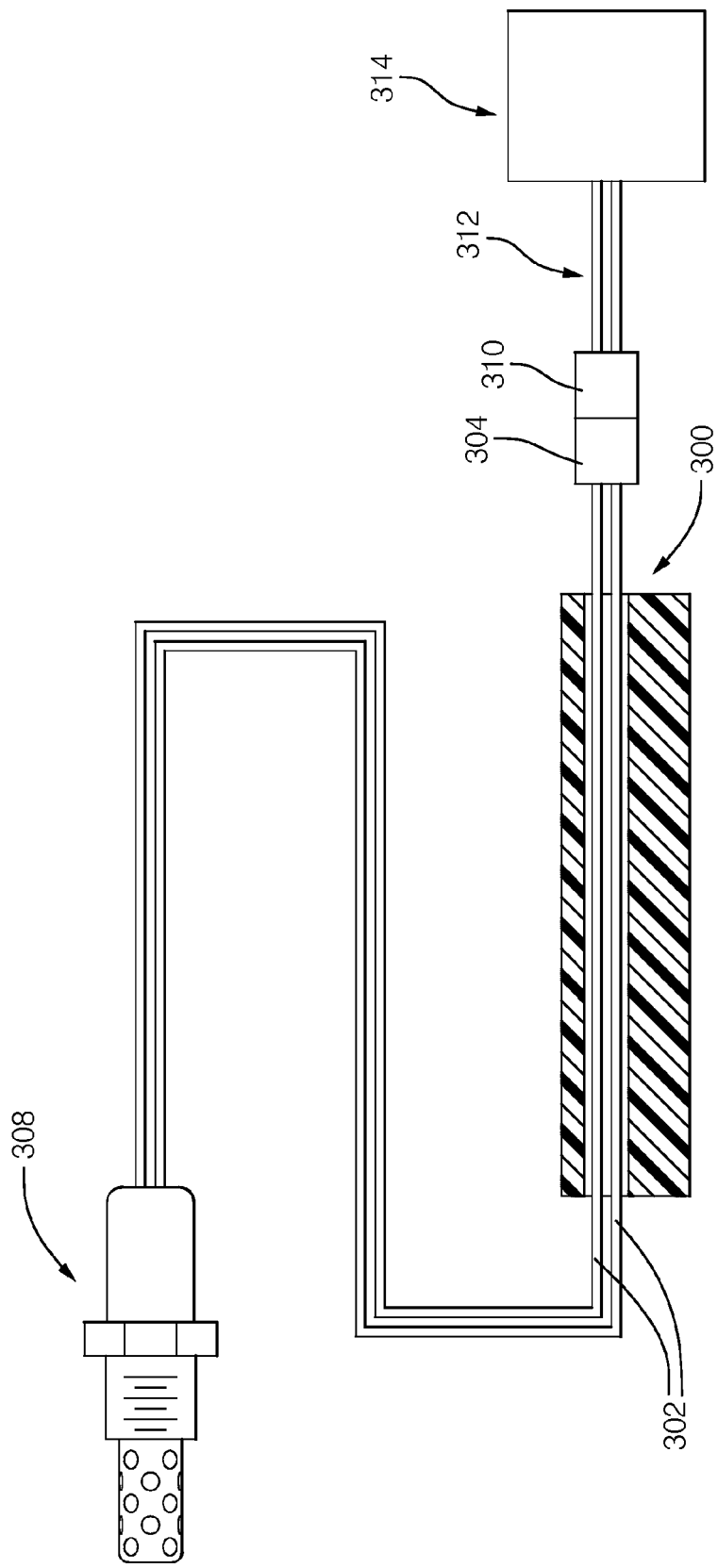
FIG. 9 is a cross-sectional view of the wire retention clip of FIG. 7 taken through section line 9-9 and shown in an exemplary environment.

Reference will now be made to FIG. 7-9 which is a third embodiment of a wire clip 300 which is used to retain a plurality of wires 302 together. Wires 302 may terminate at one end to an electrical device which is illustrated as exhaust gas sensor 308. Wires 302 may terminate at a second end with a device connector 304 which is used to interface with a controller connector 110 attached to controller wiring harness 312 which is connected to a controller 314. Controller 314 sends and/or receives signals to/from exhaust gas sensor 308 during the operation of exhaust gas sensor 308. Wire clip 300, wires 302, device connector 304, exhaust gas sensor 308, controller connector 310, controller wiring harness 312, and controller 314 comprise an exhaust gas sensor system as shown in FIG. 9.

Wire clip 300 includes a body 316 which may, for example, be made of a plastic material. Body 316 may include a body groove 318 in an exterior surface of body 316. Body groove 318 extends from one end of body 316 to another end of body 316 for receiving at least a portion of wires 302. Body groove 318 defines at least in part a first compartment 320. Wires 302 pass through first compartment 320 uninterrupted.

Body 316 also includes a second compartment 322 defined by a hollow section within body 316. Second compartment 322 is distinct from first compartment 320. Second compartment 322 holds an electronic device illustrated as circuit board 324 with integrated circuit 326. Wires 328 extend into second compartment 322 for electrical connection with circuit board 324 and integrated circuit 326. The end of wires 328 opposite to the end connected to circuit board 324 and integrated circuit 136 terminate at exhaust gas sensor 308 for connection to exhaust gas sensor 308. It should be noted that wires 328 are not visible in FIG. 9. Circuit board 324 and integrated circuit 326 may be used, for non-limiting example only, to provide compensation to exhaust gas sensor 308 for part to part variations as disclosed in US Patent Application Publication number 2007/0146114.

Cover 330 may be provided to retain wires 302 within body groove 318 and to enclose second compartment 322. Cover 330 may include cover groove 332 which is aligned with body groove 318 for receiving at least a portion of wires 302. Cover groove 332 defines at least in part first compartment 320. Cover 330 may be hinged with body 316, for example, with living hinge 334. Living hinge 334 is formed integrally as a single piece of material that also forms body 316 and cover 330 in such a way that allows living hinge 334 to flex to allow cover 330 to move between a closed position (shown in solid lines in FIG. 8) and an open position (shown as phantom lines in FIG. 8). The closed position retains wires 302 within first compartment 320 while the open position allows access to body groove 318 and cover groove 332 along the length of each of body groove 318 and cover groove 332 to allow wires 302 to be inserted therein. The side of cover 330 that is opposite to living hinge 334 may include a first latch member 336 that interfaces with a second latch member 338 of body 316 to retain cover 330 in the closed position. While body groove 318 and cover groove 332 have been shown to be provided in body 316 and cover 330 respectively, it should now be understood that only one groove may be provided in either body 316 or cover 330 for receiving all of wires 302. It should now also be understood that cover 330 may be fixed to body 316 by other means, for example only, adhesives, heat staking, or welding.

Cover 330 encloses second compartment 322 when cover 330 is in the closed position. In this way, cover 330 defines in part second compartment 322. Cover 330 may also compress wires 328 when cover 330 is in the closed position in order to provide strain relief to wires 328.

While wires 138, 238, 328 have been shown to connect to circuit boards 134, 234, 324 and integrated circuits 136, 236, 326 respectively, it should now be understood that part of circuit boards 134, 234, 324/integrated circuits 136, 236, 326 may be a wireless transmitter and/or receiver. In this way, wires 138, 238, 328 may be eliminated because the signals that would have passed therethrough may be transmitted wirelessly. The wireless transmitter/receiver may be powered, for example only, by a battery, energy harvesting (thermal or vibration), or electromagnetic power transfer.

Figure 10:
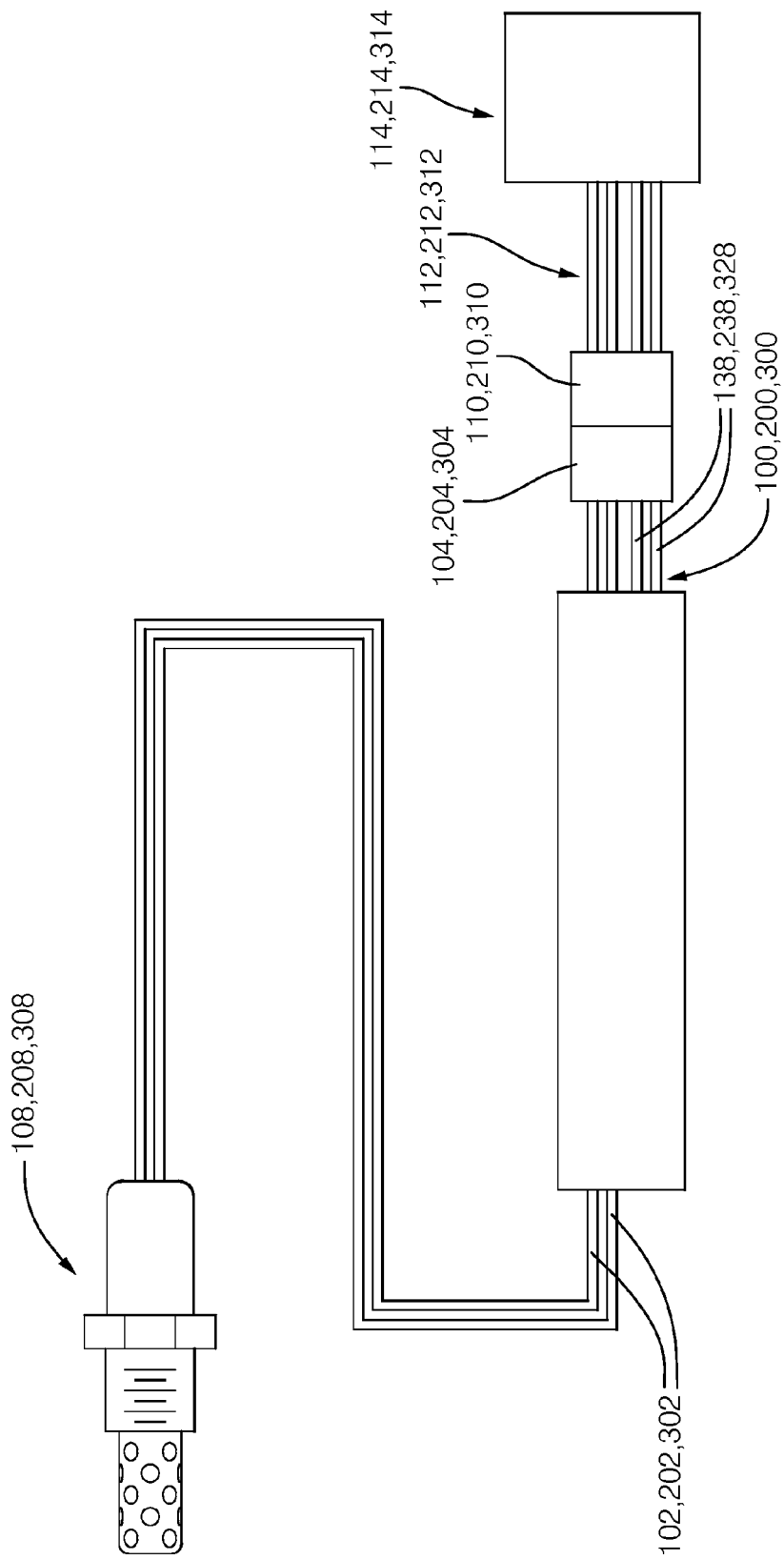
FIG. 10 is an alternative environment of the three embodiments of FIGS. 1-9.

While the embodiments described thus far have described wires 138, 238, 338 as terminating at exhaust gas sensor 108, 208, 308 for connection to exhaust gas sensor 108, 208, 308; it should now be understood that wires 138, 238, 338 may alternatively terminate at device connector 104, 204, 304 which is used to interface with controller connector 110, 210, 310 attached to controller wiring harness 112, 212, 312 which is connected to controller 114, 214, 314. This arrangement is shown schematically in FIG. 10. In this arrangement, circuit board 134, 234, 334 and integrated circuit 136, 236, 336 may be used, for non-limiting example only, to provide identification information to controller 114 as disclosed in U.S. patent application Ser. No. 13/432,520.

While this invention has been described in terms of preferred embodiments thereof, it is not intended to be so limited.

We claim:

1. A wire retention clip comprising:
    a first compartment for allowing at least a first wire to pass through said first compartment uninterrupted and for retaining said first wire to said wire retention clip;
    a second compartment distinct from said first compartment and containing an electronic device;
    a body with a hollow section which defines said second compartment; and
    a cover that is disposable on said body to define at least in part said first compartment.

2. A wire retention clip as in claim 1 wherein at least one of said body and said cover includes a groove which defines at least in part said first compartment.

3. A wire retention clip as in claim 2 wherein said cover is attached to said body by a hinge which allows said cover to be selectively positioned relative to said body in a position selected from a closed position which prevents access to said groove along the length of said groove and an open position which allows access to said groove along the length of said groove when said cover is open.

4. A wire retention clip as in claim 3 wherein said hinge is a living hinge.

5. A wire retention clip as in claim 3 wherein said body includes a first latch member and wherein said cover includes a second latch member such that said first latch member interfaces with said second latch member to retain said cover in said closed position.

6. A wire retention clip as in claim 1 wherein said cover defines at least in part said second compartment.

7. A wire retention clip as in claim 1 wherein at least a second wire extends into said second compartment for electrical connection with said electronic device.

8. A wire retention clip as in claim 7 wherein said second wire is clamped between said cover and said body to provide strain relief to said second wire when said cover is in said closed position.

9. A wire retention clip as in claim 7 wherein one end of said second wire is in electrical connection with said electronic device and the other end of said second wire is in electrical connection with a controller.

10. A wire retention clip comprising:
    a first compartment for allowing at least a first wire to pass through said first compartment uninterrupted and for retaining said first wire to said wire retention clip;
    a second compartment distinct from said first compartment and containing an electronic device; and
    a body with a hollow section which defines said second compartment;
    wherein said electronic device includes a wireless transmitter for transmitting a signal.

11. An exhaust gas sensor system comprising:
    an exhaust gas sensor; and
    a wire retention clip comprising:
        a first compartment for allowing at least a first wire to pass through said first compartment uninterrupted and for retaining said first wire to said wire retention clip, said first wire being in electrical communication with said exhaust gas sensor; and
        a second compartment distinct from said first compartment and containing an electronic device.

12. An exhaust gas sensor system as in claim 11 further comprising at least a second wire extending into said second compartment for electrical connection with said electronic device, said second wire being in electrical communication with said exhaust gas sensor.

13. An exhaust gas sensor system as in claim 11 further comprising at least a second wire extending into said second compartment for electrical connection with said electronic device, said second wire being in electrical communication with a controller.

* * * * *